Figure 1:
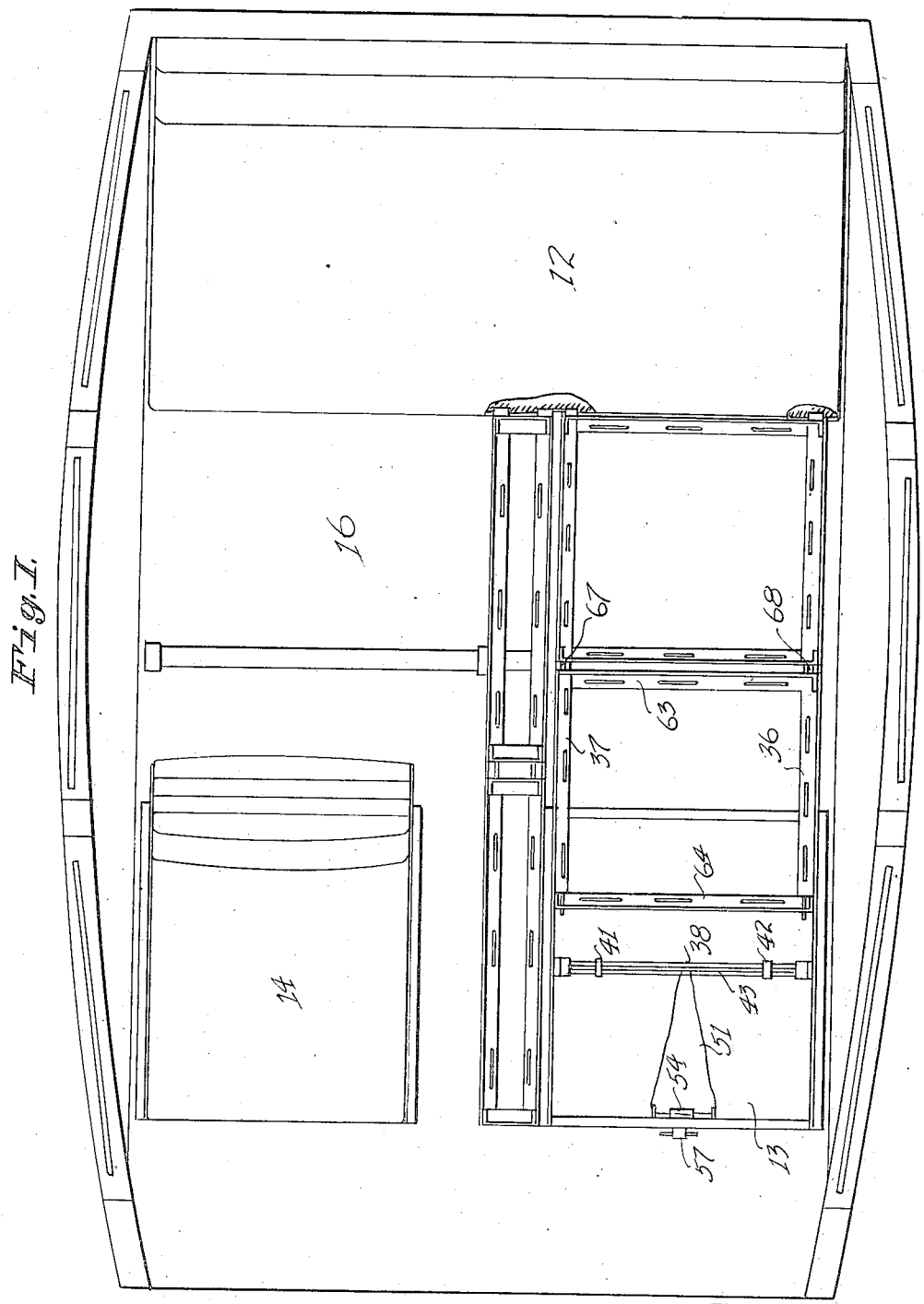

June 5, 1923.

C. MANDEL

FOLDING AUTOMOBILE BED

Filed May 1, 1922

1,457,984

3 Sheets-Sheet 1

Inventor,
Carl Mandel.
By Victor J. Evans
Attorney

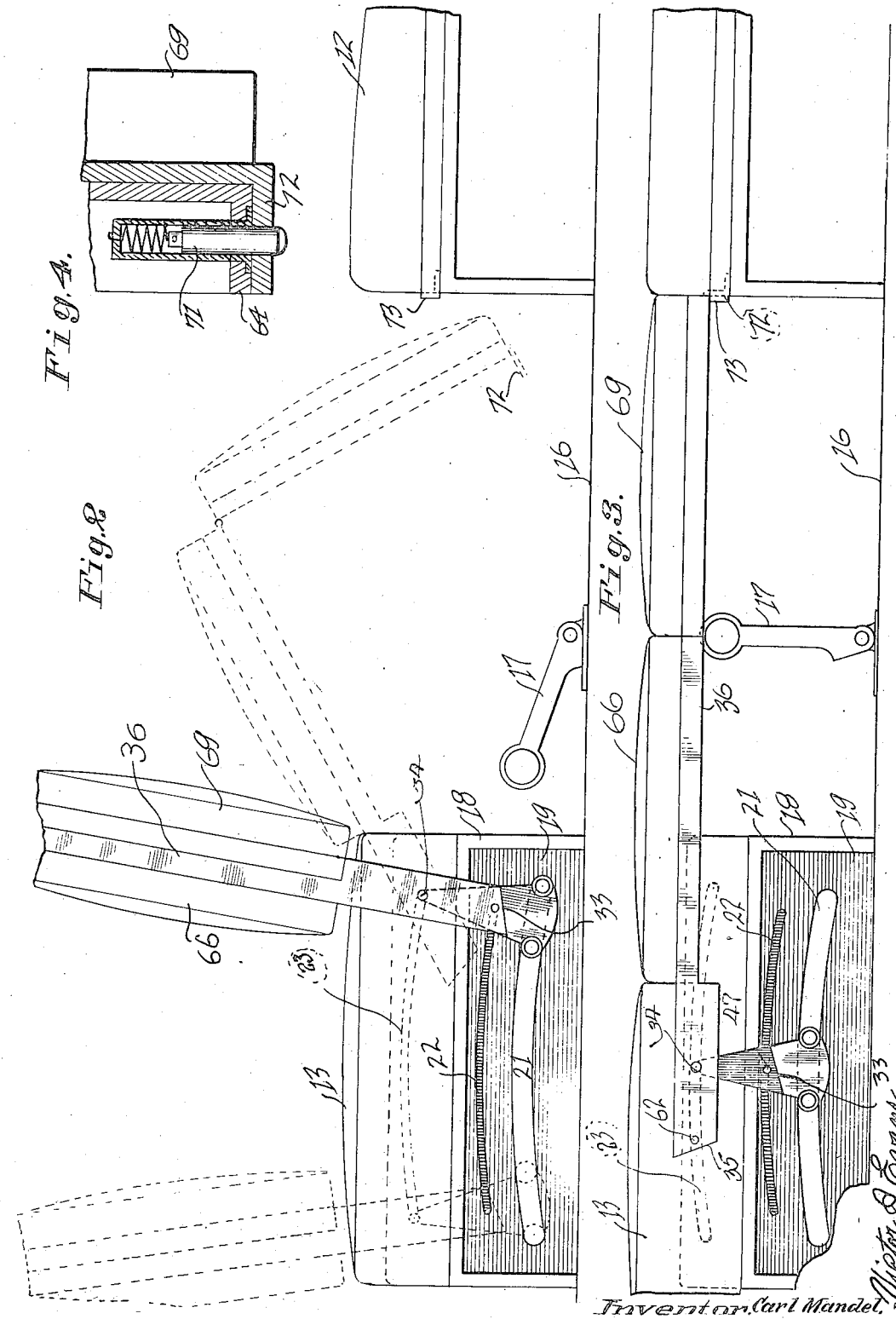

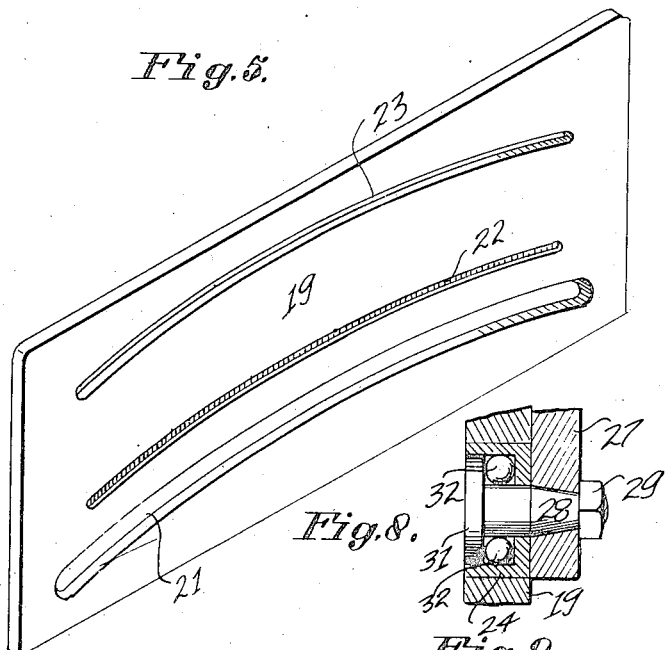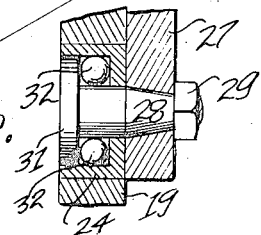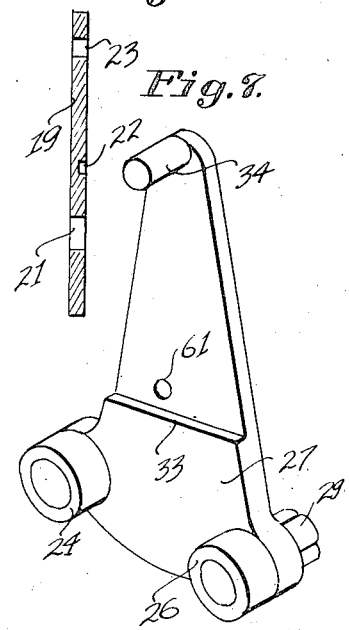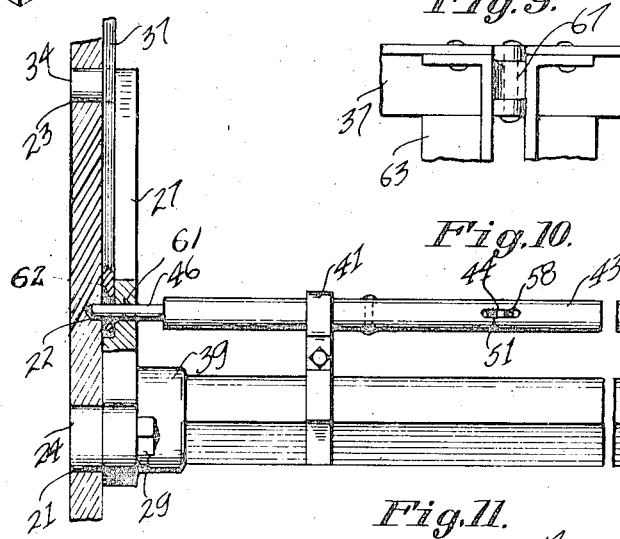

Patented June 5, 1923.

1,457,984

UNITED STATES PATENT OFFICE.

CARL MANDEL, OF SAN FRANCISCO, CALIFORNIA.

FOLDING AUTOMOBILE BED.

Application filed May 1, 1922. Serial No. 557,632.

*To all whom it may concern:*

Be it known that I, CARL MANDEL, a citizen of Finland, residing at San Francisco, in the county of San Francisco and State of California, have invented new and useful Improvements in Folding Automobile Beds, of which the following is a specification.

This invention relates to improvements in folding automobile beds.

The principal object of this invention is to produce an automobile bed which may be folded when not in use in such a manner as to appear as an ordinary automobile seat.

Another object is to produce a simple device of this character wherein simplicity in construction and operation are salient points.

Another object is to produce a seat which may be converted into a bed or moved so as to be reversible.

Other objects and advantages will be apparent during the course of the following description.

In the accompanying drawings forming a part of this specification and in which like numerals are employed to designate like parts throughout the same, Figure 1 is a top plan view of an automobile body showing the frame work of my bed in a folded and unfolded position, Figure 2 is a detail view of my folding bed in relation to the front and rear seats of an automobile, Figure 3 is a detail view showing my bed in open position, Figure 4 is a fragmentary detail cross-section showing the means for locking the folding portion of my bed, Figure 5 is a perspective detail view of one of the side plates, Figure 6 is a cross-section of one of the sides plates, Figure 7 is a perspective view of one of the movable supports, Figure 8 is a fragmentary detail view of the bearing, Figure 9 is a fragmentary detail view of a hinging connection, Figure 10 is an enlarged detail view partly in cross-section showing the manner of locking my bed in an upright position, and Figure 11 is a fragmentary detail view partly in cross-section showing the manner of operating the latch mechanism.

In the use of an automobile, it is of considerable advantage at times to be able to sleep in the car, either owing to inability to reach one's destination or owing to climatic conditions. It is to provide a comfortable bed which to all intentions is fully concealed, that I have devised my folding bed wherein the numeral 12 refers to the rear seat of an automobile, while the numerals 13 and 14 refer to the front seats. The numeral 16 designates the floor of the car which has the usual foot rail 17. In carrying out my invention, I reconstruct the front seat by causing the seat cushions to be slidable so that they may be moved from the position shown in Figure 2 to the position shown in Figure 3. To each end of the cushion support designated by the numeral 18, I attach a plate 19. This plate is provided with an arcuate opening 21 above which is an arcuate shaped recess 22 and spaced therefrom is an arcuate opening 23. The arcuate shaped opening 21 is adapted to receive rollers 24 and 26 mounted upon a movable support 27, it being understood that there are two of these supports. The construction of these rollers is best shown in Figure 8 wherein a stud 28 is held within the support 27 as by a nut 29. This stud is provided with a head 31, which is adapted to contact balls 32 which in turn contact the rollers 24. These supports are each provided with an inclined abutment 33 and at their upper ends with outstanding lugs 34 which are adapted to travel in the arcuate openings 23 of the plates 19. These lugs 34 also serve the purpose of acting as a pivot for the back support frame work of the upholstery it being understood that there is a back support on each side of the seat which are designated by the numerals 36 and 37 (see Figure 10). These back supports are each provided with an inclined end 35 which is adapted to contact the abutment 33 as shown in Figures 2 and 10. In order to maintain these supports in an upright position when it is desired to use the upholstery as a back rather than a bed I provide a latch mechanism which is secured to a cross brace 38 having its end secured in the sockets 39 formed in the movable supports. This cross-brace 38 is preferably rectangular in shape so as to support brackets 41 and 42. These brackets serve to clamp a tubular member 43 having a slot 44 centrally located therein. Mounted in the extremities of this tubular member 43 are sliding bolts as shown at 46 and 47. The construction of these bolts is best shown in Figure 11 where it will be noted that a spring 48 abuts the inner end of the bolt and has its opposite end abutting a pin 49 mounted within the tubular member. A cable 51 is secured to the bolt and has its free end passing over a pin 52 thence downwardly through the opening 44 from whence it passes around the eye bolt 53 and thence around a drum 54. This drum 54 may be rotated by means of a shaft 56 which is provided with a handle 57. It will be noted that the cable 58, which is secured to the bolt on the opposite side of the seat from the one illustrated in Figure 11, passes through an eye bolt 59 and thence beneath the drum 54, the object of which is to cause both bolts to be drawn toward each other as the handle 57 is revolved. These bolts 46 and 47 after leaving the tube 43 first pass through the opening 61 in the movable supports 27 thence through openings 62 in the back supports 36 and 37. After passing therethrough the ends of these bolts are adapted to extend into the arcuate shaped recess 22. The back supports are connected as by the usual frame work shown at 63 and 64 to which the usual upholstery 66 is secured. This upholstery 66 is adapted to face the front of the vehicle. A similar frame work supporting the upholstery 66 is hinged at 67 and 68 as best shown in Figure 1, to which frame work upholstery 69 is secured. This last mentioned hinged frame work with the upholstery attached thereto, is held in parallel alignment with the first mentioned upholstery frame by a spring pressed latch 71, the construction of which is best shown in Figure 4, and needs no further description. This latch passes through a suitable opening in the portion 72, which portion is adapted to engage the cushion retaining element 73 of the back seat 12.

The operation of my device is as follows:—

Assuming that the parts are in the position shown in Figure 2, it will be observed that by pushing on the upholstery 69 the back as a whole may be caused to travel forwardly similar to the action of a seat in the standard railway coach, if desired. When it is desired to convert this seat into a bed, the parts are placed in the position shown in Figure 2. The front seat 13 is then moved forwardly into the position shown in Figure 3, after which the latch 71 is released allowing the frame work carrying the upholstery 69 to swing downwardly or in a substantially vertical position. By now rotating the handle 57, the bolts 46 and 47 will be withdrawn from their engagement with the openings 62 in the seat portions 36 and 37. This will immediately allow the back to move to the approximate dotted line position of Figure 2, after which the foot rest 17 is moved to the position shown in Figure 3 and the portion 72 is caused to engage the cushion retaining element 73. When it is desired to return the parts to their normal position shown in full lines in Figure 2, the members 72 and 73 are disengaged and the hinged upholstery frames are caused to swing upwardly upon the pivots 34 which action brings the inclined ends 35 in the back supports to contact with the inclined abutments 33 at which time the free ends of the bolts 46 and 47 will again enter the openings 62 of the back supports and serve to retain the same in their normal position until released. At the same time, the latch 71 will engage the part 72 and maintain the upholstery 69 and its associated frame work in contact with the upholstery 66 and its frame work.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In an automobile bed, the combination of front and rear seats, slotted plates secured to the sides of said front seat, supports mounted in said slots and having roller engagement therewith, a brace extending between said supports, back supports pivoted on said movable supports, sliding bolts normally locking said back supports to said movable supports in alignment therewith, a frame hingedly secured to said back supports at their upper extremities, means for holding said frame in parallel alignment with said back supports and means for releasing said back supports thereby permitting movement of the latter and said frame into substantially the same plane as said seats.

2. In a device of the character described, the combination with an automobile having front and rear seats, a vertical plate secured to each side of said front seat, arcuate shaped openings formed in said plate, movable supports carried by said plates, rollers mounted on said movable supports and adapted to engage one of said arcuate shaped openings, a brace extending between said supports, back supports pivoted to said movable supports, sliding bolts adapted to lock said back supports to said movable supports, and a hinged frame secured to said back supports at their upper extremities, substantially as and for the purpose described.

In testimony whereof I affix my signature.

CARL MANDEL